(12) United States Patent
Saib

(10) Patent No.: US 6,208,296 B1
(45) Date of Patent: Mar. 27, 2001

(54) METHOD AND APPARATUS FOR TRAINING A RECEIVER ON A SOURCE

(75) Inventor: Joseph Saib, Englewood, CO (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 0 days.

(21) Appl. No.: 09/122,531

(22) Filed: Jul. 24, 1998

(51) Int. Cl.[7] .................. G01S 5/02; G01S 3/16; G01S 3/28; H04B 7/185; H01Q 3/00

(52) U.S. Cl. ............... 342/422; 342/352; 342/384; 342/423; 342/359; 343/757

(58) Field of Search ................ 342/352, 385, 342/420, 422, 423, 449, 359; 136/246, 243, 244; 455/226.1, 226.2, 334; 343/757; 348/570

(56) References Cited

U.S. PATENT DOCUMENTS

| | | | |
|---|---|---|---|
| 3,824,595 | * 7/1974 | Hall | 342/432 |
| 3,935,575 | * 1/1976 | Leisterer et al. | 342/384 |
| 4,041,494 | * 8/1977 | Ewen et al. | 342/458 |
| 4,283,588 | * 8/1981 | Zitzelsberger | 136/246 |
| 4,418,350 | * 11/1983 | Rosen | 342/359 |
| 4,605,968 | 8/1986 | Hayashi . | |
| 4,682,234 | * 7/1987 | Naimpally | 348/565 |
| 5,019,910 | * 5/1991 | Filmer | 348/552 |
| 5,027,430 | * 6/1991 | Yamauchi et al. | 455/188.1 |
| 5,237,166 | 8/1993 | Ito et al. . | |
| 5,250,953 | * 10/1993 | Jones et al. | 342/423 |
| 5,274,382 | * 12/1993 | Wills et al. | 342/359 |
| 5,347,286 | * 9/1994 | Babitch | 342/359 |
| 5,386,587 | 1/1995 | Yuzawa . | |
| 5,463,401 | * 10/1995 | Iwasaki | 342/359 |
| 5,493,310 | 2/1996 | Ota . | |
| 5,589,841 | 12/1996 | Ota . | |
| 5,719,637 | * 2/1998 | Ohkura et al. | 348/564 |
| 5,903,237 | * 5/1999 | Crosby et al. | 342/359 |

OTHER PUBLICATIONS

Data and Telecommunications Dictionary, Julie K. Peterson, CRC Press, New York, 1999. p. 458.*

* cited by examiner

Primary Examiner—Thomas H. Tarcza
Assistant Examiner—Fred H. Mull
(74) Attorney, Agent, or Firm—Blakely, Sokoloff, Taylor & Zafman LLP

(57) ABSTRACT

A method and apparatus for training a receiver on a source are provided. The receiver is an antenna and the source is a broadcast satellite. A first signal sensor receives at least one signal from the source. The first signal sensor may be a first low noise block (LNB) downconverter of the antenna. At least one secondary signal sensor measures a strength of the received signal. The secondary signal sensor comprises four LNB downconverters, wherein each of the four LNB downconverters are located on each of four sides of the first signal sensor. The measured strength of the received signal is used to provide guidance information for training the receiver on the source. When the broadcast satellite moves relative to the antenna, the secondary LNB downconverters detect a variance in the measured strength of the at least one signal and provide guidance information based on the detected variance, thereby reducing the training time for the antenna.

20 Claims, 4 Drawing Sheets

METHOD AND APPARATUS FOR TRAINING A RECEIVER ON A SOURCE

A FIELD OF THE INVENTION

The present invention relates to the training of a receiver on a source, and, specifically to minimizing the training time of the source.

BACKGROUND OF THE INVENTION

Television broadcasting technology has improved tremendously since its inception. The current generation of broadcasting system technology comprises a number of types of direct satellite broadcasting systems. With these systems, a user, or viewer, receives television programming via a satellite broadcast to their satellite antenna and receiver. The typical satellite broadcasting system has increased in popularity because it provides the user with many viewing options, including hundreds of channels of programming, program directories that allow for channel surfing among program descriptions while watching a particular program on one channel, custom user-formatted menus, message receipt functions from a service provider, and on-demand selection of pay-per-view broadcasts. As the demand for the satellite television systems increases, so to does the demand for systems that can be quickly and easily installed by the user, typically a non-professional satellite system installer.

An area where improvement is desired in the installation of typical satellite television systems is the aiming, or training, of the user antenna to receive a signal from the broadcast satellite. Currently, a typical method for training the antenna comprises moving the antenna around while monitoring the flash frequency of a small light or light-emitting diode. Furthermore, the coarse training may involve moving the antenna around while monitoring a sequence of beeps. The frequency of the flashing light or the beeps serve as an indication of the relative signal strength of the received satellite signal. While providing some coarse guidance, these techniques are not very precise and may lead to a great deal of user frustration.

SUMMARY OF THE INVENTION

A method and apparatus for training a receiver on a source are provided. According to one aspect of the invention, the receiver is an antenna and the source is a broadcast satellite. A first signal sensor receives at least one signal from the source. The first signal sensor may be a first low noise block (LNB) downconverter of the antenna. At least one secondary signal sensor measures a strength of the received signal. In one embodiment, the secondary signal sensor comprises four LNB downconverters, wherein each of the four LNB downconverters are located on each of four sides of the first signal sensor. In an alternate embodiment, the secondary signal sensor comprises an array of LNB downconverters, wherein the array of LNB downconverters forms a concave parabolic shape. The measured strength of the received signal is used to provide guidance information for training the receiver on the source. When the broadcast satellite moves relative to the antenna at least one of the four secondary LNB downconverters detects a variance in the measured strength of the at least one signal. The secondary LNB downconverters provide guidance information based on the detected variance, wherein training time for the antenna is minimized. The guidance information may comprise relative azimuth and elevation information to the broadcast satellite.

These and other features, aspects, and advantages of the present invention will be apparent from the accompanying drawings and from the detailed description and appended claims which follow.

BRIEF DESCRIPTION OF THE DRAWINGS

The objects, features, and advantages of the present invention will be apparent to one skilled in the art from the following detailed description in which.

DETAILED DESCRIPTION OF THE INVENTION

In the method and apparatus of the present invention the broadcast system described is a direct broadcast satellite system. However, it is readily apparent to one skilled in the art that other antenna-based systems may use the method and apparatus of the present invention. Furthermore, it is readily apparent to one skilled in the art that other systems in which a receiver is trained on a source in order to receive a signal from the source may utilize the method and apparatus of the present invention.

In the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well known electrical structures and circuits are shown in block diagram form in order not to unnecessarily obscure the present invention.

Figure 1:
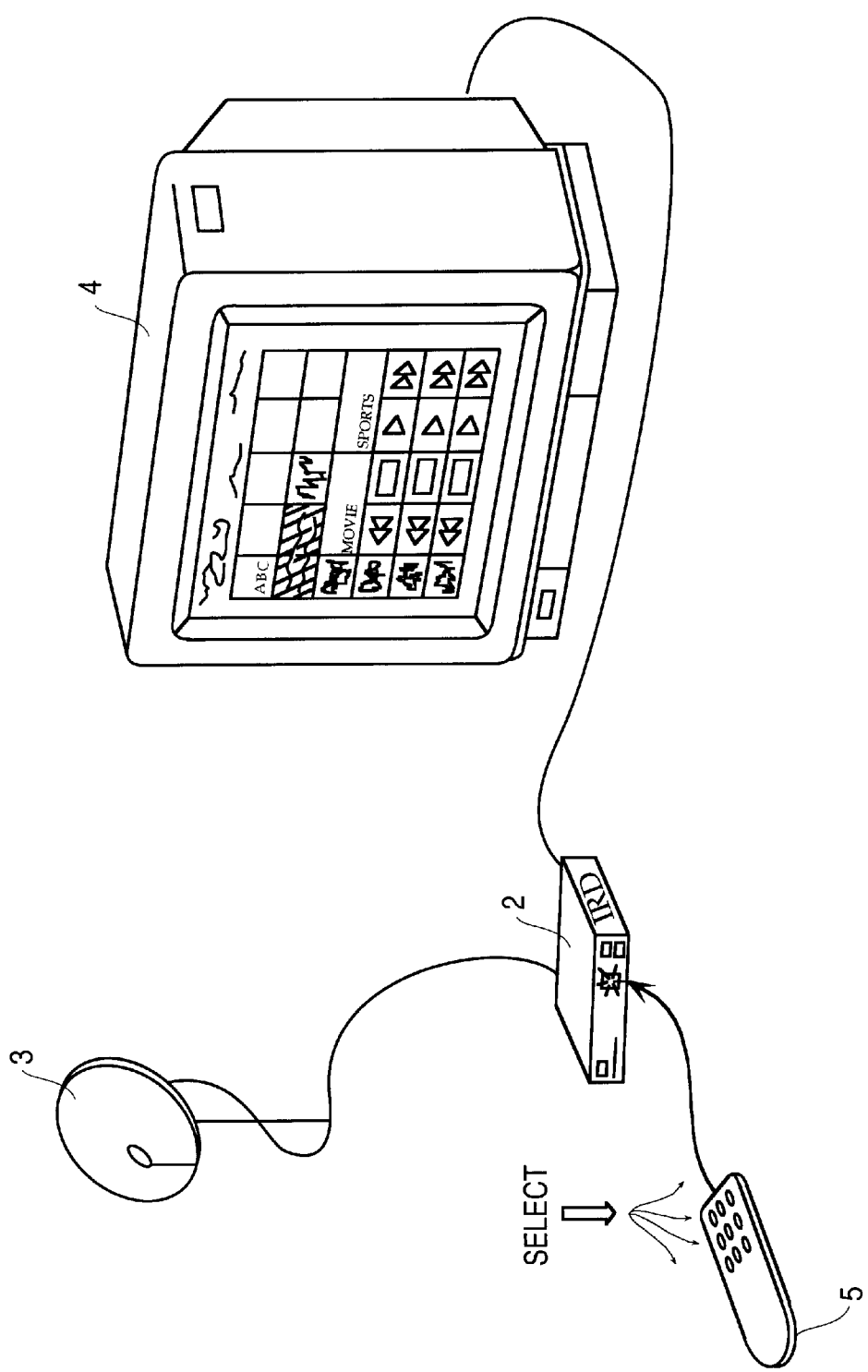
FIG. 1 is a diagram of a Direct Satellite System (DSS) of one embodiment.

FIG. 1 is a diagram of a Direct Satellite System (DSS) of one embodiment. The system has an antenna 3, an integrated receiver/decoder 2 (IRD), a remote controller 5, and a monitor 4. Packets of data are transmitted by a transponder on the satellite. Each transponder transmits data in a time share manner at a predetermined frequency. The antenna 3 receives an encoded data signal sent from a satellite. The data is received in encrypted and encoded, or compressed, form. The antenna 3 has a low noise block down converter 3a (LNB). The LNB 3a converts a frequency of a signal sent from the satellite to another frequency. The converted signal is supplied to the IRD 2. A tuner 21 of a decoder is tuned in to the frequency of the transponder corresponding to a channel, which is designated by a viewer so that the packets of digital data are received by the decoder. The received encoded signal is decoded by the IRD. The monitor 4 receives a signal from the IRD 3.

Figure 2:
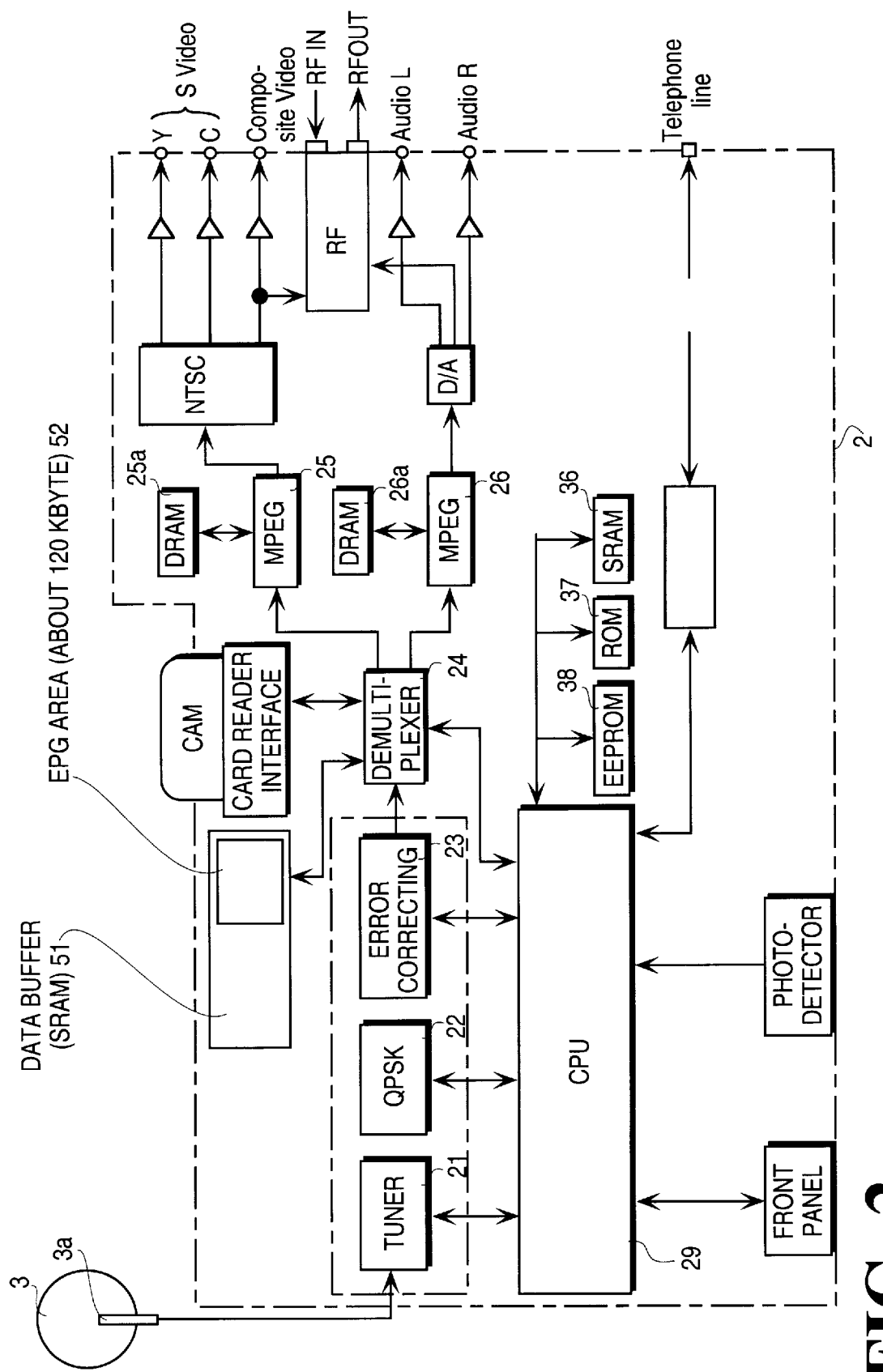
FIG. 2 is a block diagram of an integrated receiver/decoder (IRD) of one embodiment.

FIG. 2 is a block diagram of the IRD of one embodiment. A radio frequency (RF) signal output from the LNB 3a of the antenna 3 is supplied to a tuner 21. The output from the tuner 21 is supplied to a quadrature phase shift keying (QPSK) demodulation circuit 22 for demodulation. The output from the QPSK demodulation circuit 22 is supplied to an error correcting circuit 23 for error correction. A transport IC 24 receives the data stream, consisting of packets of data, from the error correcting circuit 23 and directs portions of the data stream to the appropriate circuit for processing.

The digital data stream sent from a satellite includes headers for classifying the different portions of the data in the digital data stream. The transport IC stores the headers in registers and uses the headers to direct the data. The data stream sent from the satellite, includes video data in the format specified by the Motion Pictures Expert Group standard (MPEG), MPEG audio data, and electronic programming guide (EPG) or electronic menu data. Data that is identified by its header to be video data is transferred to an MPEG video decoder 25. Data that is identified by its header to be audio data is transferred to an MPEG audio decoder 26. Similarly, data having a header that identifies the data to be EPG data is transferred to a predetermined area 52 in the data buffer 51 designated to store the EPG or electronic menu. The MPEG video decoder 25 decodes the video signal received from the transport IC. Dynamic random access memory (DRAM) 25a, connected to the MPEG video decoder 25, is used for buffering and storage of video data during processing by the MPEG video decoder. The MPEG audio decoder 26 decodes the digital audio signal. The DRAM 26a, connected to the MPEG audio decoder 26, is used for buffering of data and information during processing by the MPEG audio decoder 26.

The CPU 29 is the central control mechanism and executes code stored in the ROM 37 to perform certain functions of the system. The CPU receives and processes user input to provide the user functionality and access to the broadcasting system. Moreover, the CPU accesses user settings and preferences for processing of information and configuration of the system. The user settings are stored in the non-volatile memory, such as electrically erasable programmable read-only memory (EEPROM) 38. The CPU further maintains a list of pointers, stored in static random access memory (SRAM) 36, to the channel information and program information stored in the SRAM 51.

Figure 3:
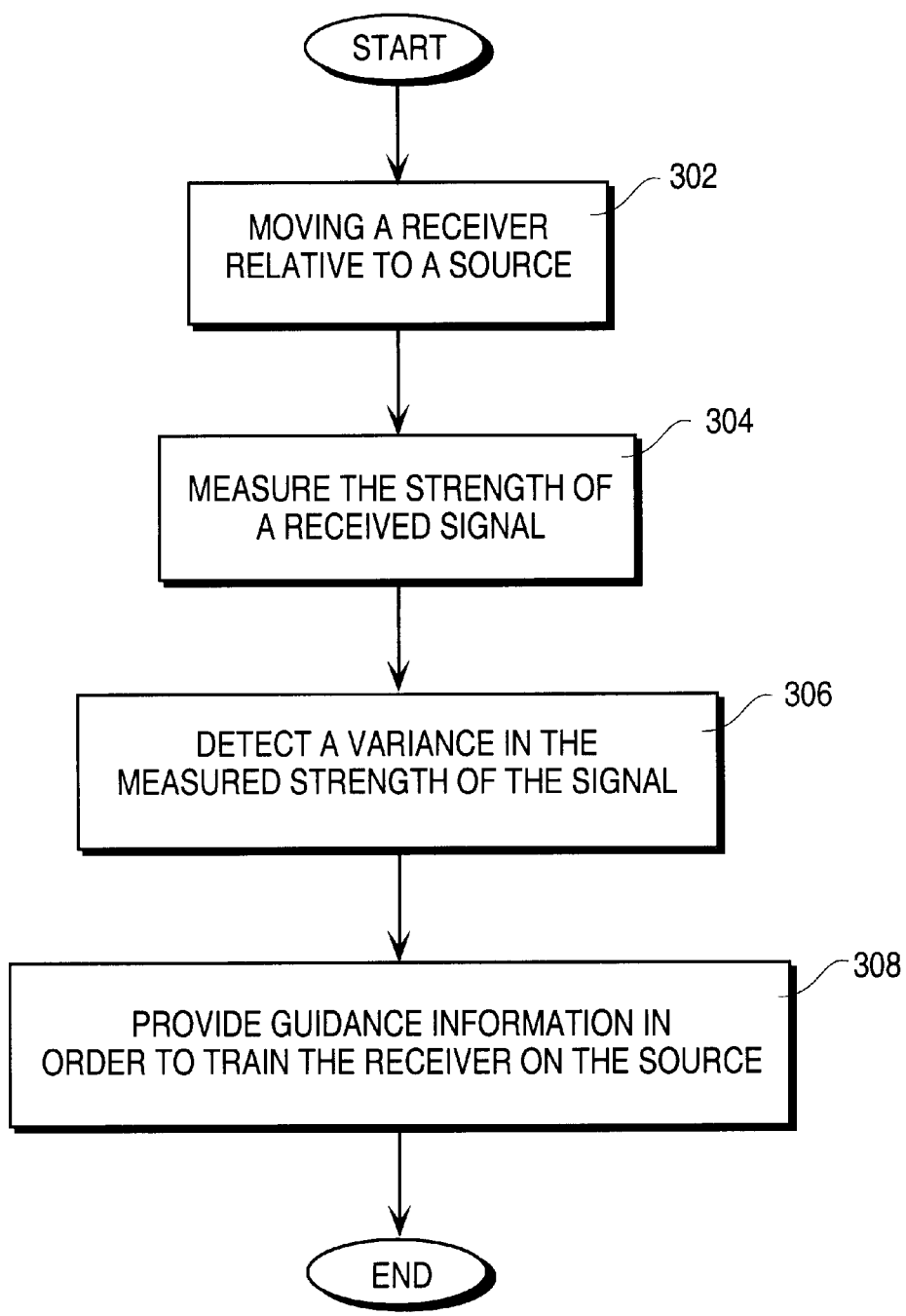
FIG. 3 is a flowchart illustrative of training a receiver on a source in one embodiment of the invention.

FIG. 3 is a flowchart illustrative of training a receiver on a source in one embodiment of the invention. In one embodiment, the receiver is an antenna and the source is a broadcast satellite, but the embodiment is not so limited. Operation begins at step 302, at which the antenna is moved relative to the broadcast satellite. A first signal sensor receives at least one signal from the source. The first signal sensor may be a first low noise block (LNB) downconverter of the antenna, but the embodiment is not so limited. At least one secondary signal sensor measures a strength of the received signal, at step 304. In one embodiment, the secondary signal sensor comprises four LNB downconverters, wherein each of the four LNB downconverters are located on each of four sides of the first signal sensor, but the embodiment is not so limited. In an alternate embodiment, the secondary signal sensor comprises an array of LNB downconverters, wherein the array of LNB downconverters forms a concave parabolic shape.

When the broadcast satellite moves relative to the antenna, at least one of the four secondary LNB downconverters detects a variance in the measured strength of the at least one signal, at step 306. The measured strength of the received signal is used to provide guidance information for training the receiver on the source, at step 308. The secondary LNB downconverters provide guidance information based on the detected variance, wherein training time for the antenna is minimized. The guidance information may comprise relative azimuth and elevation information to the broadcast satellite, but the embodiment is not so limited.

Figure 4:
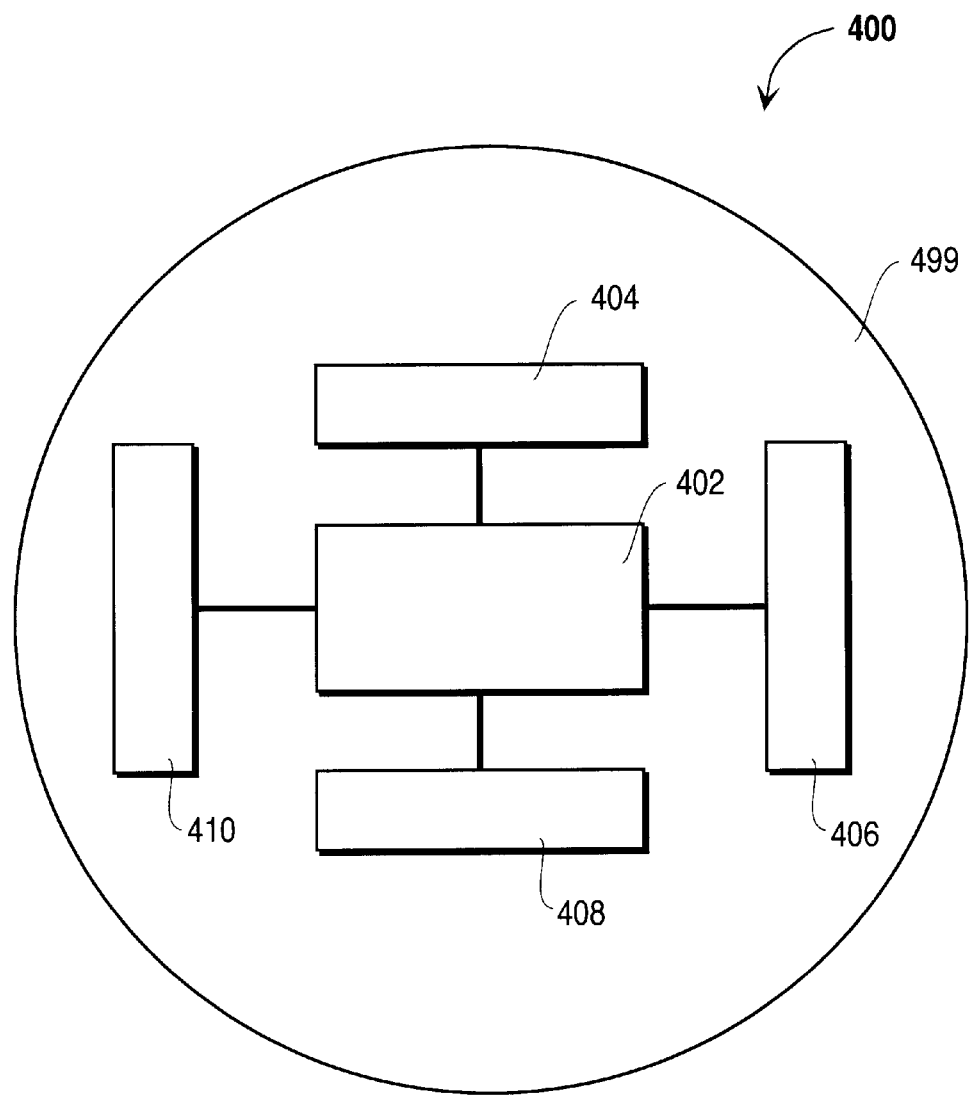
FIG. 4 is a satellite antenna system comprising the secondary signal sensors of one embodiment of the invention.

FIG. 4 is a satellite antenna system 400 comprising the secondary signal sensors of one embodiment of the invention. The antenna system 400 of one embodiment comprises a first LNB downconverter 402 and four secondary LNB downconverters 404, 406, 408, 410, but the embodiment is not so limited. Each of the four secondary LNB downconverters are located on each of four sides of the first LNB downconverter, but the embodiment is not so limited. The primary function of the first LNB downconverter is to receive the broadcast signal; however, the first LNB downconverter also functions to measure the strength of the received signal. The primary function of the secondary LNB downconverters is to measure the strength of the received signal. The secondary LNB downconverters may be tilted in towards the first LNB downconverter, but the embodiment is not so limited.

The system of secondary LNB downconverters provides guidance information by detecting a variance in the measured strength of the received signal when the broadcast satellite moves relative to the antenna. The detected variance provided by some combination of the first LNB downconverter and the secondary LNB downconverters provides guidance information for training, or pointing, the antenna 499. The guidance information may comprise azimuth and elevation information relative to the broadcast satellite, but the embodiment is not so limited. The guidance information may be provided to a user to aid the user in manually orienting the antenna with respect to the broadcast satellite. In an alternate embodiment, the guidance information may be provided to a processor to aid in automatically orienting the antenna with respect to the broadcast satellite.

The number of secondary LNB downconverters used in the secondary LNB array of the antenna system depends on the expected strength of the received signal, the span of the LNB array in detecting the signal, and the speed of the LNB array in measuring a change in signal strength. Where the satellite signal is reasonably strong and easy to detect, the secondary LNB array can detect the signal even when many degrees off of dead center relative to the LNB array. In this situation, four small secondary LNB downconverters would be used, with one secondary LNB downconverter on each of four sides of the first, or primary, LNB downconverter. If a satellite signal is expected to be weak and hard to detect, the secondary LNB array would be larger and formed in the shape of a concave parabolic dish, but the embodiment is not so limited.

The method and apparatus for training a receiver on a source using secondary LNB downconverters may be used for directional finding applications in which a receiver is trained on a source. For example, secondary LNB downconverters may be used when the receiver is a solar panel and the source is sunlight. As a further example, secondary LNB downconverters may be used when the receiver is a first moving vehicle and the source is a second moving vehicle.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for training a receiver on a source, wherein the apparatus comprises:

a first signal sensor having one or more sides receiving at least one signal from the source wherein the first signal sensor is located on the receiver and the at least one signal is digitally encoded data; and at least one secondary signal sensor located on the receiver measuring a strength of the at least one signal, wherein the measured strength of the at least one signal is used to provide guidance information for training the receiver on the source and the at least one secondary signal is located on one of the one or more sides of the first signal sensor.

2. The apparatus of claim 1, wherein the receiver is an antenna and the source is a broadcast satellite.

3. The apparatus of claim 2, wherein the guidance information comprises azimuth and elevation information of the receiver relative to the broadcast satellite.

4. The apparatus of claim 2, wherein the first signal sensor measures the strength of the at least one signal.

5. The apparatus of claim 2, wherein the guidance information is provided to a user to aid the user in orienting the antenna with respect to the broadcast satellite.

6. The apparatus of claim 2, wherein the guidance information is provided to a processor to aid in automatically orienting the antenna with respect to the broadcast satellite.

7. The apparatus of claim 1, wherein the receiver is a solar panel and the source is sunlight.

8. The apparatus of claim 1, wherein the receiver is a first moving vehicle and the source is a second moving vehicle.

9. An apparatus for training an antenna on a broadcast satellite, wherein the apparatus comprises:
a first signal sensor receiving at least one signal from the source; and
at least one secondary signal sensor measuring a strength of the at least one signal, wherein the measured strength of the at least one signal is used to provide guidance information for training the receiver on the source, wherein the first signal sensor is a first low noise block (LNB) downconverter of the antenna, wherein the at least one secondary signal sensor comprises four LNB downconverters, wherein each of the four LNB downconverters are located on each of four sides of the first signal sensor.

10. The apparatus of claim 9, wherein when the broadcast satellite moves relative to the antenna at least one of the four secondary LNB downconverters detects a variance in the measured strength of the at least one signal, wherein the four secondary LNB downconverters provide the guidance information based on the detected variance, wherein training time for the antenna is minimized.

11. The apparatus of claim 9, wherein the at least one secondary signal sensor comprises an array of LNB downconverters, wherein the array of LNB downconverters forms a concave parabolic shape.

12. A method of training a receiver on a source, said receiver having a first signal sensor, the method comprising:
moving the receiver relative to the source;
measuring at least one signal strength of at least one signal received from the source using at least one secondary signal sensor;
providing guidance information using the at least one signal strength measurement, wherein the guidance information is used to train the receiver on the source.

13. The method of claim 12, wherein the receiver is an antenna and the source is a broadcast satellite, wherein the first signal sensor is a first low noise block (LNB) downconverter of the antenna, wherein the at least one secondary signal sensor comprises four LNB downconverters, wherein each of the four LNB downconverters are located on each of four sides of the first signal sensor.

14. The method of claim 13, wherein the guidance information comprises azimuth and elevation information of the receiver relative to the broadcast satellite.

15. The method of claim 13, further comprising detecting a variance in the measured strength of the at least one signal when the broadcast satellite moves relative to the antenna, wherein the four secondary LNB downconverters provide the guidance information based on the detected variance.

16. A broadcast system comprising:
a display device;
a processor coupled to said display device, said processor configured to control the system to provide a plurality of television channels to a viewer;
an antenna coupled to the processor, wherein the antenna comprises an apparatus for training the antenna on a broadcast source, wherein the apparatus comprises,
a first signal sensor receiving at least one signal from the broadcast source; and
at least one secondary signal sensor measuring a strength of the at least one signal, wherein the measured strength of the at least one signal is used to provide guidance information for training the antenna on the source.

17. The broadcast system of claim 16, wherein the broadcast source is a satellite, wherein the first signal sensor is a first low noise block (LNB) downconverter of the antenna, wherein the at least one secondary signal sensor comprises four LNB downconverters, wherein each of the four LNB downconverters are located on each of four sides of the first signal sensor.

18. The broadcast system of claim 17, wherein the guidance information comprises azimuth and elevation information of the receiver relative to the broadcast satellite.

19. The broadcast system of claim 17, wherein when the broadcast satellite moves relative to the antenna at least one of the four secondary LNB downconverters detects a variance in the measured strength of the at least one signal, wherein the four secondary LNB downconverters provide the guidance information based on the detected variance, wherein training time for the antenna is minimized.

20. The broadcast system of claim 17, wherein the at least one secondary signal sensor comprises an array of LNB downconverters, wherein the array of LNB downconverters forms a concave parabolic shape.

* * * * *